United States Patent [19]

Brandt et al.

[11] 3,899,741

[45] Aug. 12, 1975

[54] FREQUENCY SHIFT KEYED DETECTOR

[75] Inventors: Randy Brandt, Cupertino; Richard B. Rice, Los Gatos, both of Calif.

[73] Assignee: Cermetek, Inc., Mountain View, Calif.

[22] Filed: Nov. 12, 1973

[21] Appl. No.: 414,935

[52] U.S. Cl. .................. 329/104; 178/88; 325/320; 325/346; 329/122; 331/23

[51] Int. Cl.[2] .......................................... H04L 27/14

[58] Field of Search ............. 329/104, 122; 331/23; 325/320, 346, 402, 403, 348, 419; 178/88; 328/167

[56] References Cited

UNITED STATES PATENTS

| | | | |
|---|---|---|---|
| 3,233,181 | 2/1966 | Calfee | 325/320 X |
| 3,257,508 | 6/1966 | Crafts et al. | 325/320 X |
| 3,525,945 | 8/1970 | Puente | 325/419 X |
| 3,541,451 | 11/1970 | Lind | 325/346 |
| 3,757,132 | 9/1973 | Nilsson | 178/88 X |

*Primary Examiner*—Alfred L. Brody
*Attorney, Agent, or Firm*—Alan H. MacPherson

[57] ABSTRACT

A frequency shift keyed detector comprises a signel limiter, a bandpass filter, a rectifier and an output circuit activated by a signal from a clamp circuit in response to a signal produced by the rectifier. The level of an output signal from the output circuit is used to tune the bandpass filter to the frequency of the incoming information bearing signal.

13 Claims, 4 Drawing Figures

FREQUENCY SHIFT KEYED DETECTOR

BACKGROUND OF THE INVENTION

1. Field of the Invention

This invention relates to frequency shift keyed detectors and in particular to a detector comprising a tunable filter section the center frequency of which is capable of being switched between the mark and space frequencies of the incoming frequency shift keyed signal.

2. Prior Art

Frequency shift keyed signals (hereinafter referred to as "FSK" signals) are well known. Such signals, used to transmit digital information, represent a so-called "mark" (typically a binary "1") at a first frequency and a so-called "space" (typically a binary "0") at a second frequency selectively spaced from the first frequency. Frequency shift keyed data transmission and reception techniques are described for example in Bennett et al; "Data Transmission," McGraw Hill, 1965.

Various circuits have been proposed to detect the receipt of signals at both mark and space frequencies. One system uses a plurality of tuned bandpass filters, the center frequencies of which correspond to the frequencies of transmission of the FSK signals.

As electrical circuits become more complex, it has become desirable and necessary to reduce their volume, power consumption and number of components.

SUMMARY OF THE INVENTION

This invention relates to a frequency shift keyed detector which uses commonly available integrated circuits and discrete components and which achieves fast, reliable detection of the FSK signals representing marks and spaces while at the same time providing an output signal which is relatively insensitive to noise on the incoming signal.

In accordance with this invention, an FSK detector comprises a signal limiter means, a bandpass filter means capable of being rapidly tuned to the frequencies of the input signal representing the marks and spaces, rectifier means, and an output circuit means activated by a signal from clamping circuit means responsive to a signal produced in the rectifier means.

In one embodiment, the output circuit means comprises a bistable multivibrator, the level of the output signal from which represents either a mark or space.

As a feature of this invention, the detector contains only one bandpass filter. This bandpass filter, however, is capable of being tuned to the frequencies of the incoming mark and space signals. In one embodiment the bandpass filter comprises a constant bandwidth constant gain, variable frequency second order bandpass active filter section. The filter bandwidth and center frequency gain is held constant as its center frequency is made to follow the incoming mark or space frequency.

This invention is particularly useful in detecting data transmitted over long distances using voice grade or other communication lines.

DETAILED DESCRIPTION

An incoming FSK signal possesses a frequency representing either a mark or a space. For FSK signals capable of being transmitted over the telephone, a typical first frequency $F_1$ representing a space is 2025 hertz while a typical second frequency $F_2$ representing a mark is 2225 hertz.

Figure 4:
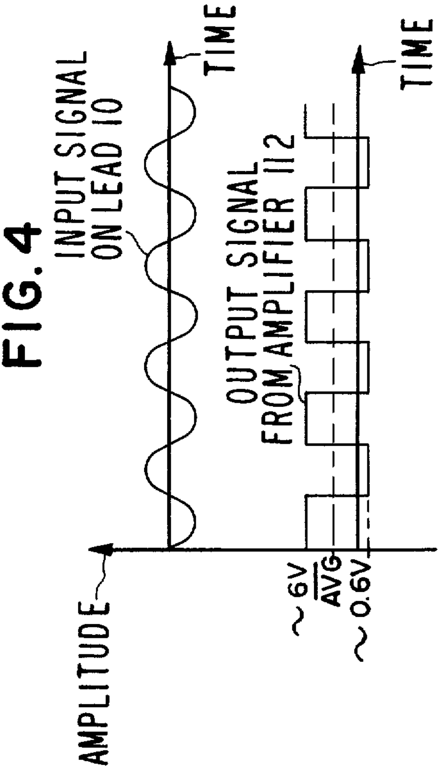
FIG. 4 shows the relationship between the input signal and the output signal from limiter 11 (FIG. 1).

To obtain the information carried by the FSK signal using the circuit of this invention, the incoming FSK signal is transmitted to limiter 11 (FIG. 1) which converts the signal to a square wave with a d.c. component (see FIG. 4). The output signal from limiter 11, which is of substantially constant amplitude for a wide range of input signal amplitudes, is then transmitted to bandpass filter 12 which removes both the harmonics of the fundamental frequency and any noise outside the passband of filter 12. Thus limiter 11 provides automatic gain control. The output signal from filter 12, a complex signal which contains frequency shift information in the form of a transient modulated carrier, is then passed through a rectifier comprising in the embodiment shown in FIG. 1 a diode detector 13 and lowpass smoothing filter 14. When bandpass filter 12 is tuned to the frequency (either $F_1$ or $F_2$) of the incoming signal on lead 10, the output signal from lowpass filter 14 (which envelope detects the transient carrier from filter 12) assumes a "high" value. This output signal controls the state of bistable multivibrator 15 such that the output signal from multivibrator 15, when fed back to bandpass filter 12, forces the center frequency of bandpass filter 12 to remain at the frequency of the incoming FSK signal on input lead 10.

Figure 2:
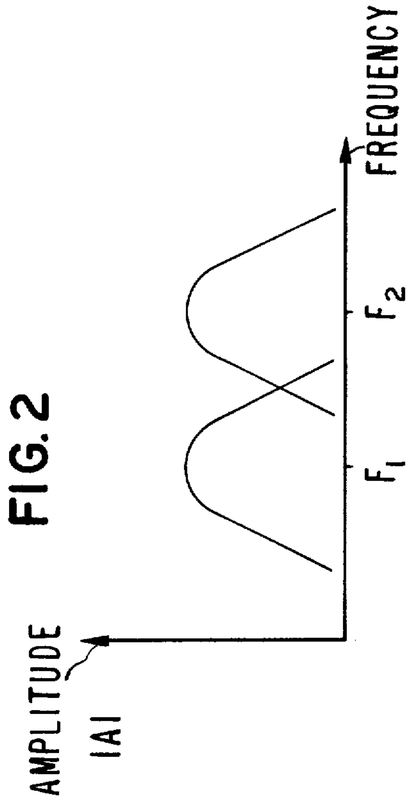
FIG. 2 shows the amplitude versus frequency characteristic of the bandpass filter 12 shown in FIG. 1.

When the frequency of the incoming signal changes, indicating that different binary information is being received, the output signal from bandpass filter 12 is significantly attenuated due to the deviation of the frequency of the incoming signal from the tuned frequency of filter 12 (see FIG. 2). Consequently, the output signal from lowpass filter 14 falls to a "low" value. As this output signal drops past a given threshold level, bistable multivibrator 15 is clocked and the signal level on its output lead changes to a new level. This new level output signal is transmitted back to bandpass filter 12 to change its center frequency to the other frequency (either $F_2$ or $F_1$) used to transmit either mark or space information. Thus the output signal from lowpass filter 14 again rises to a "high" level.

Bistable multivibrator 15 is triggered only on the negativegoing edge of the output signal from filter 14 and thus the output signal level of bistable multivibrator 15 remains at the level to which it was driven by the previous fall in the level of the signal from lowpass filter 14.

The pulse from diode detector 13 has a fall time and magnitude dependent on the frequency shift through the bandpass filter section and the bandwidth of the lowpass filter. The rise time of this pulse is dependent upon the transient response of the tuned network as well as the band width of the lowpass filter. Clamping circuit 16 prevents the detector from being turned on prematurely in response to a transient input signal of less than a desired duration.

FIG. 2 shows the amplitude vs. frequency characteristics of bandpass filter 12. The frequencies $F_1$ and $F_2$ are selected to be sufficiently far apart that bandpass filter 12 when set at one frequency will attenuate a signal received at the other frequency a sufficient amount to trigger bistable multivibrator 15 with a given certainty. Thus a "high" output signal from lowpass filter 14 is a signal above the threshold level at which bistable multivibrator 15 is triggered and a "low" output signal from lowpass filter 14 is a signal beneath this threshold.

Figure 1:
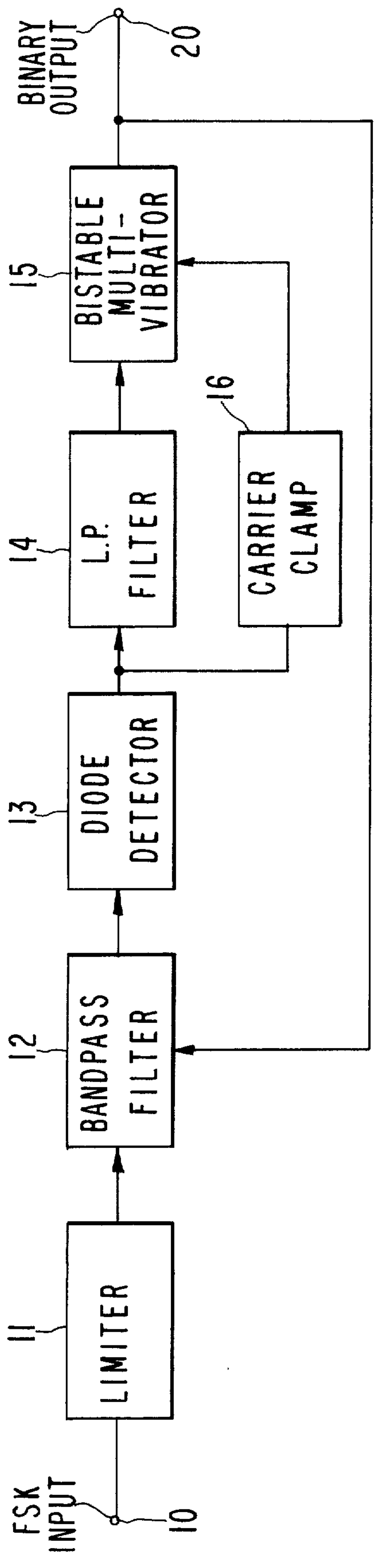
FIG. 1 shows schematically the FSK detector of this invention.
Figure 3:
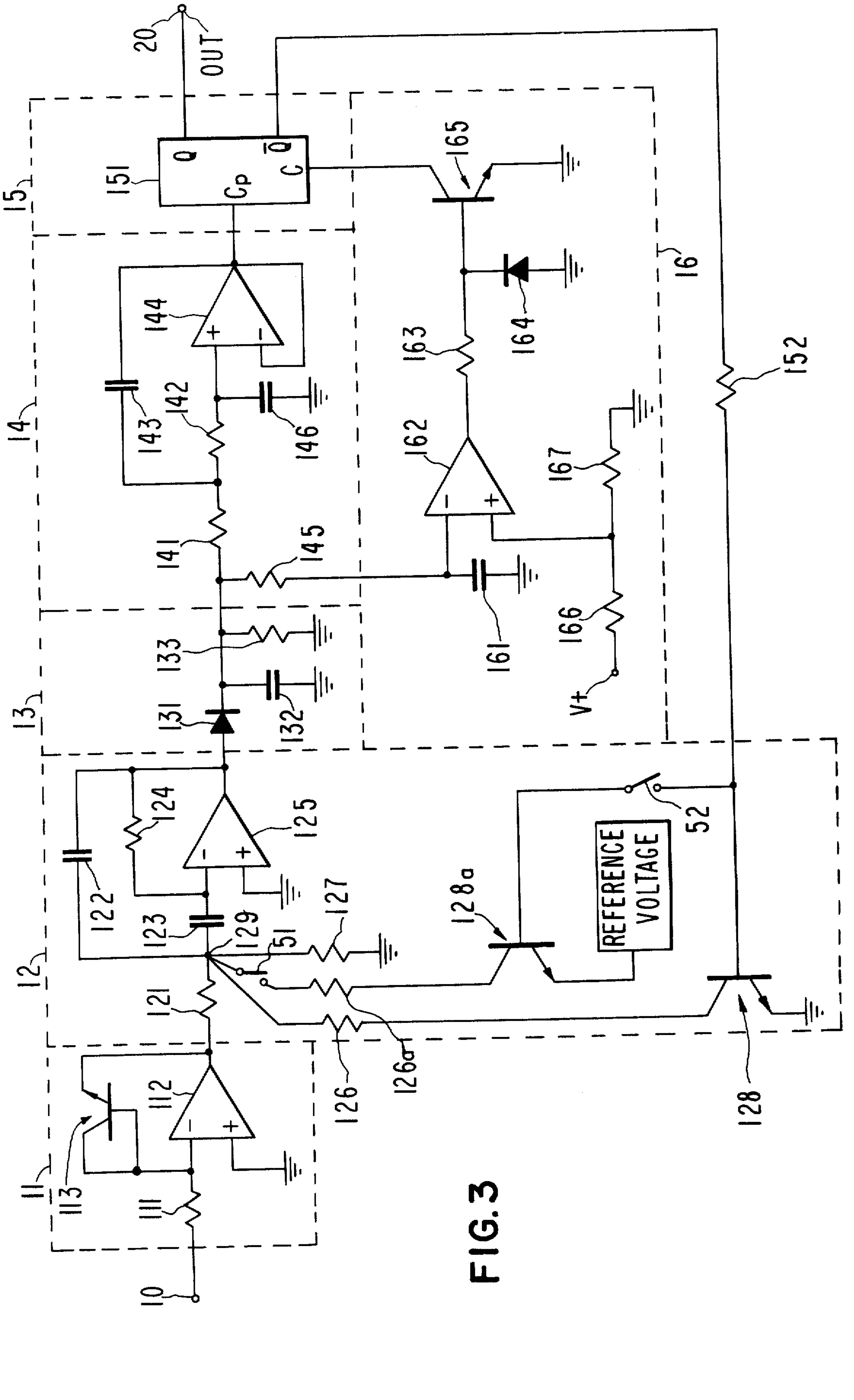
FIG. 3 shows the circuit diagram of the structure shown in FIG. 1.

The circuit of the structure shown schematically in FIG. 1 is shown in detail in FIG. 3. In the following description the standard integrated circuit components used in one embodiment of this invention will be identified in parenthesis following the first mention of the component. Other functionally equivalent components can, of course, be used in place of those described here.

The incoming FSK signal is received on input lead 10 and transmitted through resistor 111 to the negative input lead of operational amplifier 112 (μa 741). The μa 741 operational amplifier or its equivalent is available from a wide variety of semiconductor manufacturers and is described in detail, for example, in the Fairchild Semiconductor Integrated Circuit Data Catalog (1970) on page 6–133 et al. Therefore this component will not be described in futher detail here. The positive input lead to amplifier 112 is grounded.

Transistor 113 is connected as a diode from the negative input lead of amplifier 112 to its output lead. Operational amplifier 112 is connected as an inverter. Thus transistor 113, with its emitter connected to the output lead of amplifier 112 and its base and collector connected to the negative input lead to amplifier 112 causes the output signal from amplifier 112 to have the substantially square wave shape shown in FIG. 4. A negative input signal on input lead 10 is amplified and inverted by amplifier 112 and thus appears on its output lead as a positive signal. The amplitude of this positive signal is limited by the breakdown voltage of the reverse biased base-emitter junction of transistor 113. Typically, this breakdown voltage is about 6 volts. Thus, transistor 113 functions as a Zener diode for positive output voltages from amplifier 112 and limits these voltages to about 6 volts (see FIG. 4). On the other hand a positive input signal on input lead 10 results in the output signal from amplifier 112 going negative. When the base-emitter junction of transistor 113 is forward biased by the turn-on voltage of a PN junction (about 0.6 to 0.7 volts) the output signal from amplifier 112 is held a little beneath zero volts.

FIG. 4 shows the relationship between the input signal on lead 10 and the output signal from amplifier 112. Typically, this input signal is a sinusoid of approximately ± 0.5 volts peak-to-peak amplitude but can be as low as ± 2 millivolts when input line conditions vary. The output voltage of amplifier 112 for this range of input voltages will remain approximately between the limits of − 0.6 to + 6 volts as shown in FIG. 4.

The output signal from amplifier 112 is transmitted through resistor 121 and blocking capacitor 123 to the negative input lead of operational amplifier 125 (μa 741). The other input lead to amplifier 125 is grounded. The node 129 between resistor 121, and capacitor 123 has connected to it one lead from each of resistors 126 and 127. The other lead of resistor 127 is grounded while the other lead of resistor 126 is attached to the collector of NPN transistor 128. The emitter of transistor 128 is grounded and the base is connected to the "$\bar{Q}$" output lead of bistable flip flop 151 through resistor 152. The combination of resistor 121, capacitor 123, resistor 124, capacitor 122, operational amplifier 125, resistors 126 and 127, and transistor 128 functions as a bandpass filter with a center frequency $W_c$ given approximately by the following equation:

$$W_c \approx \sqrt{[1/R_{121}C_{122}R_{124}C_{123})](1+R_{121}/R_{127})}$$

$$W_c \approx \overline{W}\ \sqrt{(1+R_{121}/R_{127})}$$

Thus by changing the impedance from node 129 to ground the center frequency $W_c$ can be shifted to the desired frequency, i.e., when transistor 128 is on, the effective resistance for R127 is reduced by the parallel effect of resistor 126.

The output signal from amplifier 125 is passed through diode 131 which, together with capacitor 132 and resistor 133 functions as a diode half wave rectifier. This rectifier envelope detects the transient carrier signal from amplifier 125.

The output signal from half wave rectifier 131 is transmitted through resistors 141 and 142 to the positive input lead of operational amplifier 144 (μa 741). Capacitor 143 has one terminal connected to the node between resistors 141 and 142 and the other terminal connected to the output lead from amplifier 144. The output signal from amplifier 144 is also transmitted directly back to the negative input terminal to amplifier 144. Capacitor 146 connects the positive input lead of amplifier 144 to ground. The combination of amplifier 144 and resistors 141 and 142, and capacitors 143 and 146 behaves as a lowpass filter. The output signal from amplifier 144 is transmitted to clock input $C_p$ of flip flop 151 (typically an SN 7472).

Flip flop 151 comprises a bistable multivibrator and is clocked on the negative going edge of the output signal from operational amplifier 144. Bistable flip flop 151 is strictly amplitude sensitive and does not respond to the rate of change of the clocking signal. The "Q" output signal comprises the bilevel output signal on lead 20 from the circuit. The complementary bilevel signal on the "$\bar{Q}$" output lead is fed back to the base of transistor 128 and controls the state of transistor 128. A low level output signal on the "$\bar{Q}$" output lead from flip flop 151 shuts off transistor 128. Thus the impedence of the path controlled by switching transistor 128 appears to be infinitely high and resistor 126 conducts no current from node 129 to ground. When, however, the frequency of the FSK signal input on lead 10 to the circuit changes, the output signal from bandpass filter 12 (FIG. 1) drops in amplitude thereby causing the output signal from amplifier 144 in lowpass filter 14 to drop in amplitude. As this signal passes the threshold of the bistable flip flop 151, flip flop 151 is clocked thereby producing a high level output signal on its "$\bar{Q}$" output lead and a low level signal on its "Q" output lead. The high level output signal on its "$\bar{Q}$" output lead turns on transistor 128 thereby allowing current to flow through resistor 126 to ground. Accordingly, the effective impedance from node 129 in bandpass filter circuit 12 to ground drops thereby increasing the center frequency of bandpass filter 12 in accordance with equation (2).

Clamping circuit 16 comprises operational amplifier 162 (μa 741) together with the associated components connected as shown. These components include a resistor 145 connecting the output signal from rectifier 13 to the negative input lead of amplifier 162 and a capacitor 161 connecting the negative input lead of this amplifier to ground.

The positive input lead to amplifier 162 is connected at the node between resistors 166 and 167 connecting a positive power supply to ground. Resistors 166 and 167 function as a voltage divider. The output lead from amplifier 162 is connected by resistor 163 to the base of NPN transistor 165. Transistor 165 has its collector connected to the reset input of flip flop 151 and its emitter grounded. Diode 164 has its cathode connected to the base of transistor 165 and its anode grounded. The values of resistor 145 and capacitor 161 are selected so that a signal must be present at the output from rectifying circuit 13 for more than a given period of time, typically 100 milliseconds, before flip flop 151 can be activated and thus the circuit turned on. The collector of transistor 165 is connected to the reset input of flip flop 151. Normally, the output signal from amplifier 162 is a high level thereby insuring that transistor 165 is turned on and thus insuring a low input to the reset input of flip flop 151. This holds the signal on the "Q" output lead from this flip flop at a low level. Simultaneously, the signal on the "$\bar{Q}$" output lead from this flip flop is held to a high level thereby turning on transistor 128. When, however, a signal is received, the charge on capacitor 161 builds up thereby reducing the level of the output signal from amplifier 162. When the level of the input signal on the negative input lead to amplifier 162 becomes greater than the input signal on the positive input lead to this amplifier, the output signal inverts thereby shutting off transistor 165 and allowing flip flop 151 to be clocked in response to changes in the amplitude of the output signal from amplifier 144 in lowpass filter circuit 14. The circuit then functions as described above. Thus the carrier clamp assures the network of a valid carrier signal before it turns on.

The above described FSK transient detector is capable of detecting a change in frequency of the FSK signal in no more than 3 cycles of the input signal on lead 10. The circuit is relatively insensitive to noise, is compact, and has only one bandpass filter for detecting the mark and space frequencies of the incoming FSK signal.

While the invention has been described in conjunction with detection of two different frequencies, this invention can be modified by including other switched resistive paths connected to node 129 to vary the center frequency of the bandpass filter over more than two values. Thus, for example, this system with appropriate changes in the logic and output signal circuitry can be used with a three-logic level (i.e., tri-level) signal transmission system as well as with the bi-level system described above. In this embodiment a second transistor 128*a* similar in function to transistor 128 is added parallel to transistor 128 between node 129 and a reference voltage by closing switches 51 and 52 shown schematically. This second transistor is also connected in series with a resistor 126*a*. Flip flop 151 is replaced by a tri-level output circuit (not shown) of a wellknown type which is connected to drive both transistor 128 and the second transistor 128*a*. Thus the center frequency of bandpass filter 12 can be varied over three different values.

Other embodiments of this invention will be apparent in view of the above disclosure to those skilled in the FSK signal detection arts.

What is claimed is:

1. A frequency shift keyed detector comprising:
   input signal limiter means for receiving a frequency shift keyed signal the frequency of which is to be determined, and for producing a first intermediate signal at the same frequency as said frequency shift keyed signal;
   bandpass filter means for passing said first intermediate signal thereby to remove the harmonics and noise outside of the pass band of said bandpass filter means from said first intermediate signal and for producing a second intermediate signal at the same frequency as said first intermediate signal;
   rectifying means for receiving said second intermediate signal and for producing a rectified third intermediate signal representative of the amplitude of said second intermediate signal;
   low pass filter means for smoothing said third intermediate signal and for producing a fourth intermediate signal representing a smoothed version of said third intermediate signal;
   output signal means responsive to said fourth intermediate signal for producing an output signal, said output signal being capable of assuming two different levels in response to the amplitude of said fourth intermediate signal; and
   means, responsive to changes in the level of said output signal, for changing the center frequency of said bandpass filter means.

2. Structure as in claim 1 including means for disabling said output signal means for a given period of time following the start of the detection process to prevent noise signals from inadvertently starting said detector circuit.

3. Structure as in claim 1 wherein said bandpass filter means is capable of having a first center frequency $F_1$ and a second center frequency $F_2$, wherein $F_2$ is a higher frequency than $F_1$.

4. Structure as in claim 3 wherein said bandpass filter means has a center frequency $F_1$ when said output signal is high level and the center frequency $F_2$ when said output signal is low level.

5. Structure as in claim 1 wherein said output signal means comprises means for producing first, second and third output signals, in response to changes in the frequency of said frequency shift keyed signal, said first, second and third signals controlling the center frequency of said bandpass filter means to a first, second and third center frequency respectively.

6. Structure as in claim 1 wherein said means, responsive to changes in the level of said output signal, for changing the center frequency of said bandpass filter means comprises
   switching means for changing the value of an impedance associated with said bandpass filter means.

7. Structure as in claim 1 wherein said bandpass filter means comprises:
   an operational amplifier including a positive input lead, a negative input lead and an output lead, a selected one of said input leads being connected to a reference voltage source;
   a first resistor connecting the other of said input leads to said output lead;

a first capacitor connecting the other of said input leads to an input resistor, thereby to form a node between said first capacitor and said input resistor;

a second capacitor connecting said node to said output lead; and a third resistor connecting said node to said reference voltage source.

8. Structure as in claim 7 wherein said means, responsive to changes in the level of said output signal, for changing the center frequency of said bandpass filter means comprises:

a fourth resistor possessing two leads, one lead of which is connected to said node;

a first transistor connected between the other lead of said fourth resistor and said reference voltage source so as to function as a switch; and means, controlled by said output signal, for turning said transistor on or off in response to the level of said output signal, thereby to effectively place said fourth resistor in parallel with said third resistor when said transistor is turned on and to remove said fourth resistor from in parallel with said third resistor when said transistor is turned off.

9. Structure as in claim 8 wherein said reference voltage source is ground and said selected one of said input leads comprises said positive input lead.

10. Structure as in claim 1 wherein said output signal means responsive to said fourth intermediate signal comprises means for producing first and second complementary output signals, said complementary output signals each being capable of assuming two different levels in response to the amplitude of said fourth intermediate signal; and said means, responsive to changes in the level of said output signal, for changing the center frequency of said bandpass filter means comprises means, responsive to changes in the level of a selected one of said first and second complementary output signals, for changing the center frequency of said bandpass filter means.

11. A frequency shift keyed detector comprising:

input signal limiter means for receiving a frequency shift keyed signal, the frequency of which is to be determined, and for producing a first intermediate signal at the same frequency as said frequency shift keyed signal;

bandpass filter means for passing said first intermediate signal thereby to remove the harmonics and noise outside of the passband of said bandpass filter means from said first intermediate signal and for producing a second intermediate signal at the same frequency as said first intermediate signals;

rectifying means for receiving said second intermediate signal and for producing a rectified third intermediate signal representative of the amplitude of said second intermediate signal;

low pass filter means for smoothing said third intermediate signal and for producing a fourth intermediate signal representing a smooth version of said third intermediate signal; and output signal means for producing an output signal capable of assuming a first, a second, and a third level, in response to changes in the frequency of said frequency shift keyed signal, said first, second, and third levels of said output signal controlling the center frequency of said bandpass filter means to a first, second, and third center frequency, respectively.

12. A frequency shift keyed detector comprising:

input signal limiter means for receiving a frequency shift keyed signal, the frequency of which is to be determined, and for producing a first intermediate signal at the same frequency as said frequency shift keyed signal;

bandpass filter means for passing said first intermediate signal thereby to remove the harmonics and noise outside of the passband of said passband filter means from said first intermediate signal and for producing a second intermediate signal at the same frequency as said first intermediate signal;

rectifying means for receiving said second intermediate signal and for producing a rectified third intermediate signal representative of the amplitude of said second intermediate signal;

low pass filter means for smoothing said third intermediate signal and for producing a fourth intermediate signal representing a smoothed version of said third intermediate signal;

output signal means responsive to said fourth intermediate signal for producing an output signal capable of assuming two different levels in response to the amplitude of said fourth intermediate signal; and means for disabling said output signal means for a given period of time following the start of the detection process to prevent noise signals from inadvertently starting said detector circuit.

13. Structure as in claim 4 wherein said frequencies $F_1$ and $F_2$ correspond to the expected frequencies of said frequency shift keyed signal.

* * * * *